IMPULSE GENERATING SYSTEM AND NETWORK THEREFOR

Filed Aug. 25, 1945 2 Sheets-Sheet 1

PRESTON ROBINSON
WILLIAM M. ALLISON
NELSON E. BEVERLY
INVENTORS

BY Arthur J. Connolly
ATTORNEY

IMPULSE GENERATING SYSTEM AND NETWORK THEREFOR

Filed Aug. 25, 1945 2 Sheets-Sheet 2

PRESTON ROBINSON
WILLIAM M. ALLISON
NELSON E. BEVERLY
INVENTORS

BY Arthur J. Connolly
ATTORNEY

Patented Dec. 26, 1950 2,535,093

UNITED STATES PATENT OFFICE 2,535,093

IMPULSE GENERATING SYSTEM AND NETWORK THEREFOR

Preston Robinson, Williamstown, William M. Allison, North Adams, and Nelson E. Beverly, Williamstown, Mass., assignors to Sprague Electric Company, North Adams, Mass., a corporation of Massachusetts Application August 25, 1945, Serial No. 612,690

6 Claims. (Cl. 178—44)

Figure 1:
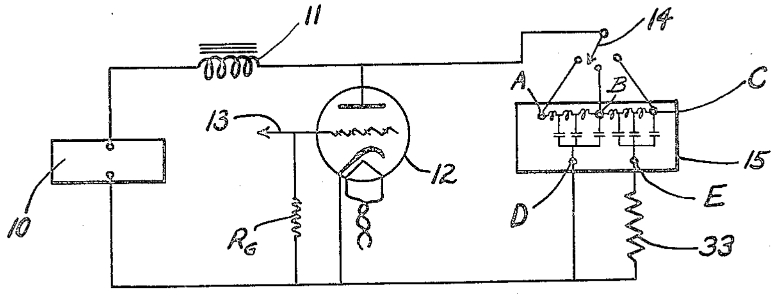

This invention relates to improved electrical circuits and more particularly refers to new electrical circuits employing square pulses of energy, including unusual electrical networks employed in these circuits.

The use of substantially square energy pulses in electronic communications equipment has been developed widely in the art in recent years. There are many applications requiring this form of signal to achieve specific and accurate results. A number of the circuits of this type employ electrical networks of the lumped constant variety for generating, delaying and/or matching substantially square energy pulses. The theoretical design of these lumped constants networks as well as many of the circuits employing the same is old in the art.

Unfortunately, however, there have been many defects in the performance of these circuits and in the network components of these prior art circuits which have rendered their widespread use either uneconomical or impractical. One of the disadvantages attendant upon circuits employing a pulse forming network is that the circuit is useful for only one length of pulse, that is, the length of time between the beginning and end, or rise and decay, of the pulse is constant irrespective of the charging voltage, the constants of power source, or the load impedance. Further, it has been found that a network produced according to the theoretical design often will produce a pulse which is not uniform or is otherwise distorted and consequently undesirable in a circuit.

It is an object of this invention to overcome the foregoing and related disadvantages. It is a further object to provide new and useful electrical circuits capable of performing several functions without resorting to use of a plurality of pulse forming networks. It is a further object to produce unitary electrical circuits capable of generating and impressing a plurality of substantially square energy pulses across a load. A still further object is to produce improved electrical networks of the lumped constant variety for use in the above and related electrical circuits. A still further object is to produce electrical networks particularly adapted for use in the foregoing and other circuits. Additional objects will become apparent from a consideration of the following description and claims.

These objects are attained in accordance with the present invention wherein there is produced an electrical circuit comprising a source of power, a high impedance reactor, an electrical network capable of generating substantially square pulses of three different lengths and a load, said electrical network and said load forming a circuit during the discharge interval. In a more restricted sense, the invention is concerned with a series electrical circuit comprising an electrical network capable of generating three different substantially square pulses and a power supply therefor, a load, and a switching device. The invention is also concerned with novel electrical networks for the above and related circuits comprising a plurality of cascades of series-inductance, shunt-capacitance meshes with all inductances connected in series, input terminals being affixed to the extreme ends of the inductances, a terminal being affixed to the junction of inductances between the two cascades, or an equivalent intermediate point where there are more than two cascades, a terminal affixed to the common condenser lead of one cascade section and an output terminal being affixed to the other common condenser lead, a three-pole switch being connected to the three terminals affixed to the inductance elements. The invention is also concerned with networks comprising two cascades of series inductance, shunt-capacitance meshes with all inductances connected in series, one of the cascades presenting an impedance differing from that of the other cascade, employed in combination to match a higher load impedance.

In accordance with one of the preferred embodiments of the invention a novel electrical circuit is produced wherein at least three pulse lengths may be impressed across a load, a contrast to the usual single pulse length associated with a unitary network. This is accomplished by discharging a special type of double cascade network by means of appropriate switches at different positions in the circuit. The electrical network is comprised of two cascades of series inductance, shunt-capacitance meshes with all inductances connected in series and a multiplicity of terminals, one being affixed to each of the extreme ends of the series connected inductances, another to the juncture of inductances between two cascades a further terminal is affixed to the common condenser lead of one cascade section and an additional terminal is connected to the common condenser lead of the other cascade section. One of the condenser terminals is attached to one side of the load while the other condenser terminal is attached to the three terminals affixed to the inductance elements. It has been found that pulse lengths of three different values are obtained by discharging through each of the three terminals at individual times.

In order to charge the network, it is customary to connect any one of the inductance terminals and the condenser terminals to opposite sides of a source of power in series with which is a high impedance reactor, the latter being employed to prevent a discharge pulse from passing into the power supply circuit.

According to one of the preferred embodiments of the invention there are produced improved electrical networks which may be used in the circuit mentioned above or in any circuits requiring pulse forming, and/or impedance matching networks. The networks are of the lumped constant cascade variety. We have discovered unexpected advantages may be obtained by suitable design of the individual elements of the network as well as their assembly and arrangement in the complete network. These networks are quite unlike those derived from a consideration of heretofore accepted theories of network design.

According to one of the specific embodiments of the invention, there is maintained in the inductance elements as a whole a Q value between about 1 and about 100 and preferably between about 5 and 75. At the same time, and in conjunction therewith, the resonant frequency of each coil of each inductance element should be at least twice the first anti-resonant frequency of the network. In addition, it is preferable that there be no more than 500 volt difference in potential between turns in any of the inductance coils. We have discovered that by limiting the Q value of the coils, the wave shape is improved. We have found that low capacity coils are preferable.

In conjunction with the specific embodiment mentioned above, we have found that optimum results may be obtained when a condenser section employed in the network be of a specific type and arranged in a hereafter specified fashion. The individual condenser units are preferably of the so-called inductive winding and more specifically should advisably possess terminal contact tabs located on the same turn on the winding and for best results no more than approximately one half turn apart, the tabs extending from the same side of the condenser winding. The units of the condenser banks may be flat-pressed and the tabs of adjacent condensers are intersoldered in series, resulting in a short current path and effecting a partial inductance neutralization or cancellation due to the current flow into one tab and out of the adjacent tab.

According to a further specific embodiment of the invention, adjacent banks of condensers are separated by a sufficient amount of insulating material to render substantially negligible the distributed capacity therebetween.

According to a further and specific embodiment of the invention, an electrical network is designed wherein the capacity between the container and the various elements of the network therein form a part of the network from the standpoint of the discharge pulse. That is, the distributed capacity to the container, is normally sufficient to cause an appreciable distortion of a pulse generated by a network container therein, although the network before incorporation into the container discharged a substantially square pulse. We are able to produce an electrical network in a hermetically sealed metal container capable of generating a substantially square energy pulse irrespective of the proximity of the container.

Figure 2:
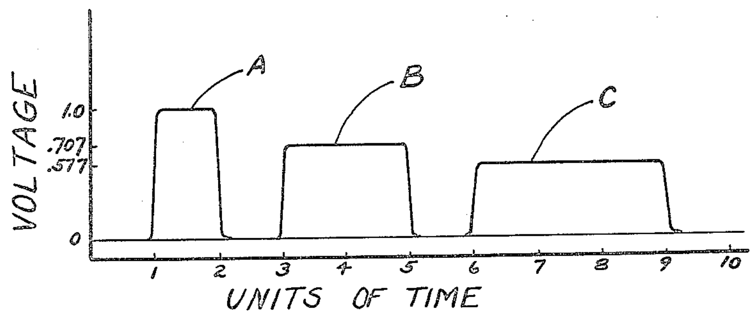
Figure 3:
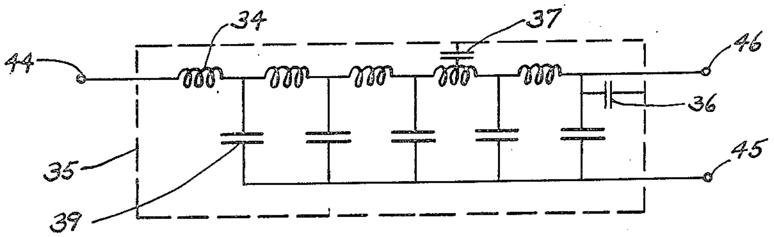
Figure 6:
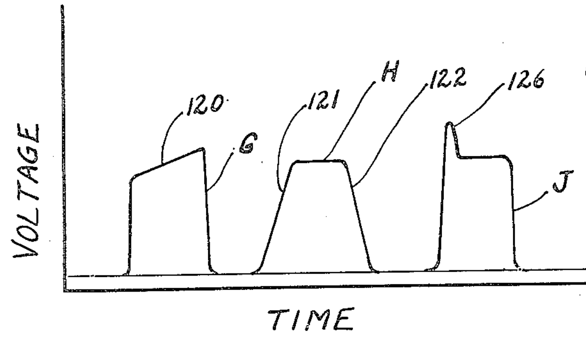
Figures 4, 5:
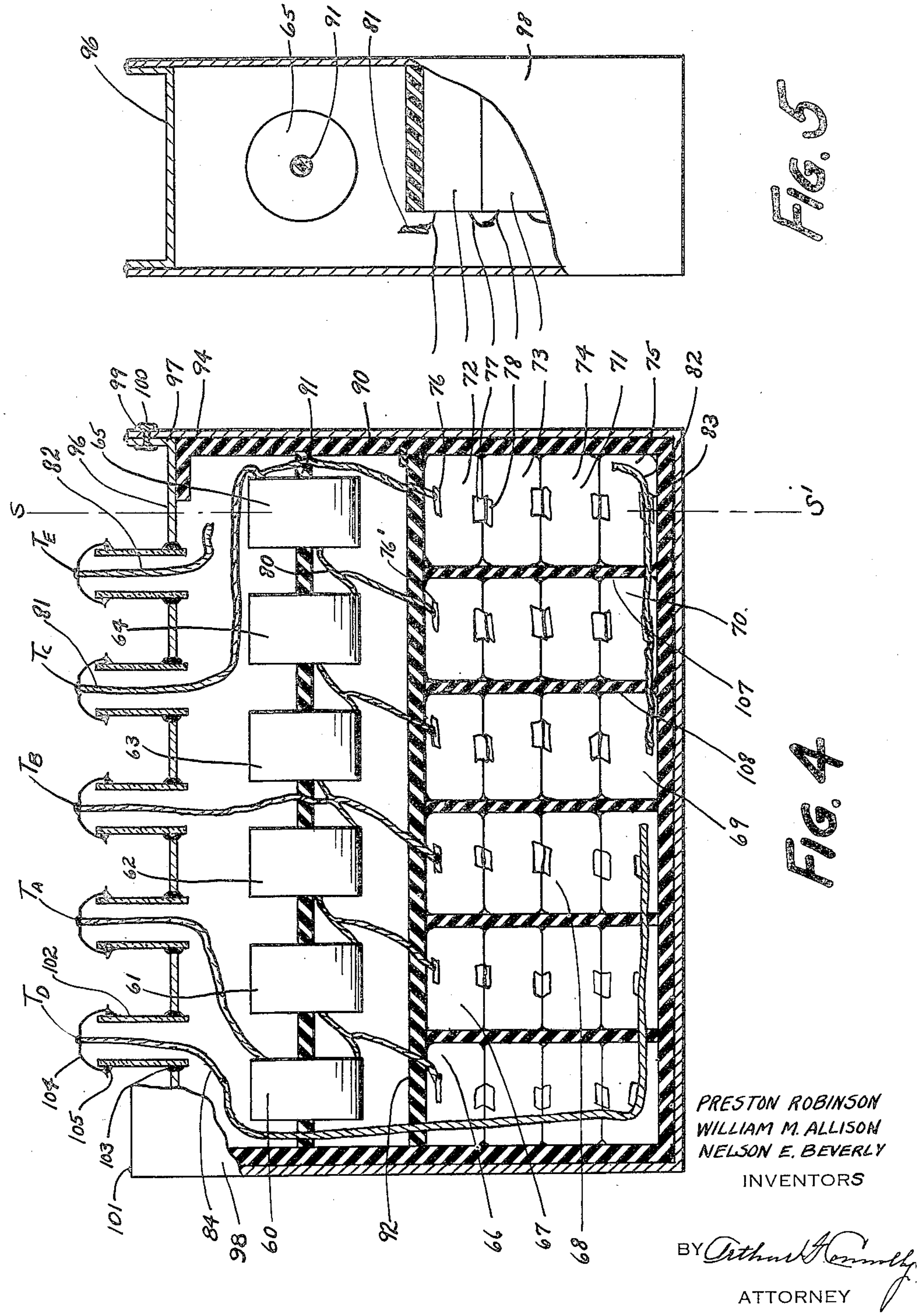

Reference will be made to the appended drawing in which:

Figure 1 represents one of the novel electrical circuits of the invention,

Figure 2 represents the substantially square discharge pulses capable of generation in the circuit, Figure 3 represents schematic diagrams of the network of the invention, suitable for use in electrical circuits, such as Figure 1, or in other electrical circuits, Figure 4 represents a partial cross-section of one of the preferred types of networks of the invention, Figure 5 represents another view of the network of Figure 4, Figure 6 illustrates several pulses capable of generation in the networks, and use in the electrical circuits forming part of this invention.

Referring more specifically to Figure 1, there is shown a novel electrical circuit useful in impressing three different energy pulses across a load. 10 represents a source of power such as a D. C. generator, battery, A. C. rectifying unit, etc. While the circuit will be described with particular reference to a D. C. power supply, it will also function with an alternating current power supply and appropriate synchronous switching means. 11 represents an inductive reactor which is designed to offer a high impedance to the flow of high frequency currents and a low impedance to low frequency currents (e. g. 60 cycles) or direct current; a suitable diode may be employed in place of the reactor 11, to prevent reverse current flow. 12 represents a thyratron tube, which serves as a switch for the discharge of the network. This switch may be of any type, manually or electronically operated, and need not be a thyratron tube, as long as it is designed to pass the power in the discharge pulse without failure. Tube 12 is excited by the grid which, as indicated by 13, is connected to a triggering power supply. When the latter reaches a certain voltage the tube is triggered and current will flow between the plate and the cathode. $R_g$ represents a grid resistor.

Switch 14 is a three-position switch, the three pole contacts leading to the terminals A, B, and C, of network 15. Switch 14 may be manually or electrically operated. Network 15 is comprised of two cascades of series-inductance, shunt capacitance meshes, all inductances of both cascades being connected in series. A, B, and C represent terminals affixed respectively to one extremity of the inductances, to the junction between the inductances of the two cascades, and to the other extremity of the inductances. Terminals D and E represent terminals connected to the common condenser leads of the two cascades, respectively. The load on the circuit is represented by 33. This load, into which the pulse is discharged, is represented as a resistance element. It may, however, consist of one or more linear and/or non-linear impedance elements. An example of a substantially linear impedance would be a pulse transformer with an air core, and a resistive load across the secondary. An example of a non-linear impedance is a coil with an iron core, the impedance varying in a complex manner as the frequency changes.

The operation of the circuit proceeds as follows: Switch 12 is first left open and network 15 is charged, with the series circuit comprising the power supply, inductive reactor, network and the load. Switch 14 must be connected to terminal A, B or C. When charging the network, it makes no difference to which of these three terminals switch 14 is connected. When the pulse is to be impressed across load 33, tube 12 is triggered to permit functioning of the discharge circuit, a series circuit containing the network 15, switches 14 and 12 and the load 33. The position of switch 14 is chosen depending upon the length of pulse desired. Network terminal D is connected to the side of the load 33 opposite to that to which network terminal E is connected, during all phases of the circuit operation. During the discharge, substantially no current will flow through the reactor 11, to the power supply 10, due to the high impedance thereof to currents of the type of the discharge pulse and/or components thereof and the short duration of pulse. It is obvious therefore that the impedance of reactor 11 should be considerably greater than the impedance of load 33 to the pulse.

It may be stated that any one point in the circuit may be grounded, for the sake of convenience of construction.

Referring now to Figure 2, which shows the pulse characteristics on discharge of network 15 of Figure 1, when switch 14 is connected to terminals A, B and C, respectively. Voltage is plotted against time, the values of each being in arbitrary units which show the magnitude of these properties in the pulses generated in the circuit described in connection with Figure 1. All of the curves shown represent a more or less symmetrical network pulse formed by discharge through a substantially resistive load. The time of rise and decay in all three pulses is reasonably short. By discharging the network 15 through terminal A, the pulse voltage is approximately equal to one half of the peak network charging voltage provided resonant charging is employed, and is represented as one unit. The pulse length is one unit of time. By discharging the network through terminal B a voltage peak of approximately .707 units is obtained, and the pulse length is doubled to approximately two units of time. By discharging through terminal C, a voltage peak of about .515 units is obtained and the pulse length is about three times that of A.

It should be emphasized that the charging need not be made through the same terminal as the discharge, but this may well be done for the sake of convenience and simplicity.

It has been found that the impedance of the circuit remains approximately the same, irrespective of which terminal switch 14 is connected to. Therefore, the novel circuit of this invention may be operated with any specific load to impress pulses of three different lengths thereacross, without appreciable distortion or impedance mismatching.

Referring now to Figure 3, the schematic electrical diagram of a cascade type network useful in the circuit of Figure 1 and in other circuits is shown. This network comprises a cascade of series inductance, shunt-capacitance meshes. The network shown has five meshes each comprising an inductance element 34 and a capacitance element 39. In the cascade type network, inductance elements are connected in series and capacitance elements are connected in shunt. Terminals are affixed to one extremity 44 of the series connected inductance elements and to the common condenser lead 45 of the shunt connected capacitance elements. Another terminal 46 may be affixed to the other extremity of the series inductance elements. Dotted line 35 represents a container, generally of metal.

Two of the networks of Figure 3 would be employed in the circuit of Figure 1 as previously discussed. For example, terminal 44 would be terminal A of Figure 1. Terminal 45 of Figure 3 would be terminal D. Terminal 46 and a terminal 44′ of a similar network would be interconnected and would be terminal B of Figure 1. Terminal 46′ of the similar network would become terminal C of Figure 1. Likewise, terminal 45′ would become terminal C of Figure 1. 36 and 37 represent the capacitance between the metal container and the network proper.

While the type of network described in connection with Figure 3 forms one of the preferred embodiments of the invention, other types of networks may be employed in place of one of the cascades referred to in Figure 1. For example, anti-resonant circuits in series with series-connected inductance and capacitance elements may be employed for the first unit.

Referring now to Figure 4, a partial cross-section of one of the preferred networks of the invention is shown. This network is of particular use for a circuit such as that described in Figure 1 because two cascades are produced in a single unitary structure. However, the various novel procedures followed in producing such a structure are equally applicable to single cascade networks such as that described in Figure 3.

The illustrated network electrically comprises two cascades of three meshes each, the inductance elements of said cascades being connected in series, terminals being affixed to the extreme ends of the inductance elements and to the juncture between the inductance elements of the two cascades, and to the common condenser lead of each cascade. The electrical components of the network are shown in perspective view, while the structural and supporting components are shown in partial cross-section. The six meshes of the network are comprised of inductance elements, 60, 61, 62, 63, 64 and 65 and capacitance elements 66, 67, 68, 69, 70 and 71, respectively. For high voltage operation, which is frequently encountered, each condenser section is generally composed of a plurality of condensers connected in series. For example, condenser section 71 is composed of individual condensers 72, 73, 74 and 75.

In accordance with one of the preferred embodiments of the invention, the condenser bank comprises a plurality of helically wound electrode foils separated by dielectric spacing material and provided with terminal tabs extending from the same side of the winding at approximately the same point thereof. Adjacent helically wound sections are interconnected by intersoldering of the tabs. More specifically we have found that unusual and totally unexpected results are obtained when the so-called inductive winding described above is employed in the individual condenser sections, and when the adjacent terminal tabs of adjacent condensers are directly intersoldered. For example, terminal tab 77 of condenser 72 is directly intersoldered with terminal tab 78 of condenser 73.

The inductance elements are series connected at the extremities of their windings by means of conductors, which are also connected to one pole of the respective condenser banks. For example, conductor 80 extends between the final turn of coil 64 to the initial turn of coil 65, and also is joined to condenser bank 70 at tab 76′. Similarly, conductor 81 leads to condenser bank 71 as well as to terminal $T_c$, to be discussed below. The common condenser lead from condenser banks 69, 70 and 71 is connected to conductor 82, which is soldered to terminal tabs of the last condenser in each condenser bank in the section, as, for example, tab 83 of condenser 75 of bank 71. This conductor is led to a suitable network terminal $T_E$, to be described below. It is obvious that the conductor 82 must be insulated from points of different potential difference and from the container, by means of "spaghetti," etc.

Insulating plates 107, 108, etc. preferably of low dielectric constant material located between adjacent condenser banks, serve to minimize the distributed capacity between condenser banks and individual meshes.

A preferred method of mounting or supporting the components of the network will now be described. The mounting shown represents one of the preferred embodiments of the invention, e. g. the network elements are affixed to the top of the container. A suitable insulating frame 90 is provided to support the condenser and coil sections. This frame is preferably of Bakelite, wood or other insulating material, and is provided with a bracket or extension 94 at the top of the frame, to permit firm attachment to the top of the container 96. The condenser banks are enclosed on the sides and bottom by the frame 90, and maintained in position by pressure from an insulating plate 92, which in turn may be held in place by dowels or plugs. It is readily apparent that alternate means of maintaining the condenser banks in place may be employed. The pressure plate may be introduced and pressure applied vertically thereon to the desired degree, whereupon dowels may be employed to hold the pressure plate 92 in its desired relationship with the frame 90 and the condenser banks, thereby maintaining a constant capacitance.

A core 91 is provided upon which the inductance coils may be wound or placed after winding. This core may be a solid rod or a tube of wood, Bakelite or other desirable insulating material. The ends thereof are generally fitted into holes provided therefor in the frame 90.

The top 96 of the container may be provided with suitable terminals of any desired type, preferably of the glass-tube bushing variety such as those described in detail in copending application Serial No. 534,192, filed May 5, 1944 by H. Barschdorf, now Patent No. 2,449,759, issued September 21, 1948. In this copending application, glass to metal seals are described which permit hermetic sealing of electrical component units by use of a special strain absorbing flange between the insulating bushing and the cover 96. The network is provided with five terminals, $T_A$, $T_B$, $T_C$, $T_D$, and $T_E$. The first three terminals $T_A$, $T_B$ and $T_C$ are the alternate discharge terminals. $T_E$ is the load terminal and $T_D$ is the so-called ground terminal leading to the side of the load opposite that to which $T_E$ leads. Each terminal, for example, $T_D$ is composed of an insulating bushing 102 hermetically sealed to the cover 96 by means of solder 103, and a cap 104 which is hermetically sealed to bushing 102 by solder 105. An appropriate glass- or ceramic-to-metal seal may be provided on the areas of the bushing where soldering is to be done. Suitable methods of forming glass-to-metal seals are disclosed in copending application Serial No. 445,609, filed on June 3, 1942 by M. Nazzewski, now Patent No. 2,386,628, issued October 9, 1945, and Serial No. 530,634, filed on April 12, 1944 by M. Nazzewski, now abandoned. The conductor 84 is soldered to the cap 104 to form permanent electrical contact thereto.

The top 96 is firmly connected to the container 98 by means of bolts, rivets, spot welding, etc. 100 through flange 97. Following mounting of the top 96, the joining edges and the bolts are soldered by solder 101 and 99, respectively, to hermetically seal the network within the container.

It is generally advisable to vacuum dry and to impregnate the network with a dielectric oil, to increase its breakdown voltage and generally improve the units. This impregnation may be accomplished in the usual manner.

Referring now to Figure 5, an end view of the network of Figure 4 is shown in partial cross-section, through section S—S'. Cover 96 fits into container 98. Coil 65 is mounted on core 91. Condensers 72, 73, etc., are held in position by means of insulating plate 92. Tab 77 of condenser 72 and tab 78 of condenser 73 are shown intersoldered to provide the desired series connection. Conductor 81 is intersoldered with tab 76 of condenser 72.

According to one embodiment of the invention, we produce improved electrical networks comprising a plurality of cascade of series-inductance, shunt capacitance meshes, each consisting of a bank wound inductance element and a so-called inductive type condenser element or series plurality thereof. The construction of Figures 4 and 5 illustrates this embodiment. While bank winding has been known for years, it has not been extensively used because of several electrical and physical disadvantages. Contrary to expectations, we have found that bank wound coils may be employed in the networks described herein to outstanding advantage, both physically and electrically. By use of the bank wound elements, especially in conjunction with the condenser elements, we have found it possible to produce cascade networks (Figures 4 and 5) capable of generating desirable square or related energy pulses in a minimum of physical volume and with a maximum breakdown voltage. The bank wound coils are of further advantage in that it is a simple matter to adjust mutual inductance between meshes merely by varying the distance between the bank wound coils along the core or varying the diameter of the coil form.

The condensers referred to above as preferred elements of the novel combination disclosed herein may also be of the staggered floating electrode plate wound type. Staggered floating electrode, plate wound condensers are described in detail in copending application Serial No. 559,388, filed on October 19, 1944 by P. Robinson et al., now abandoned. According to the disclosure therein, high voltage, low inductance condensers are produced by convolutely winding a dielectric spacer and a number of individual electrode foils introduced in the winding at spaced intervals, terminal foils of one polarity being adjacent to one edge of the dielectric spacer, floating electrode foils (without terminals) being laterally displaced across the dielectric spacers to the electrode foils of opposite polarity, which are located adjacent to the opposite edge of the dielectric spacer. The staggered floating electrode foils serve to distribute the voltage gradient between terminal foils and to permit maximum capacity per unit volume.

With the novel high voltage condensers described in the copending application mentioned above, it is possible to attain the desired capacity at the operating voltage by winding a sufficient number of terminal electrodes and floating electrodes in one element. Terminal tabs of common polarity are interconnected and joined to the inductance elements and common condenser terminal in the usual manner. Thus, a single winding may be employed in place of a plurality of series connected elements.

A specific feature of the preferred embodiment illustrated in Figure 4, is that the network elements are mounted in a frame suspended from and firmly attached to the top or cover of the network casing. While the construction shown in Figure 4 is particularly desirable, alternate structures embodying the same desirable principle may be employed.

Referring now to Figure 6, several network discharge pulses are shown, plotted as voltage versus time. Pulse G possesses a rising or positive slope 120 at the top of the pulse. This is particularly desirable in working into pulse transformers, or other reactive loads. It may be produced by lowering the inductance and increasing the capacitance per mesh away from the input of the network, or conversely, by increasing the inductance and decreasing the capacitance per mesh approaching the input of the network.

Pulse H represents the appearance of a discharge pulse across a substantially pure resistive load, and is characterised by a curved rise 121, and a gradual decay 122. This type of pulse is useful in discharging into non-linear impedance loads. It is produced by making the total number of meshes small and/or by increasing input inductance, that is, the inductance of the inductance element nearest the input terminal.

Pulse J is normal except for an initial spike 126 at the peak of the wave front, and beginning of the pulse top. This may occur in the network described in Figure 3. It may be due to excessive can capacity and/or distributed capacity in inductance elements. The spike is most readily removed by decreasing the Q of the meshes, which, in turn, may be most readily accomplished by decreasing the Q of the inductance coils.

With reference to the design and use of cascade networks of the types described in connection with Figures 4 and 5, with the usual terminal connections, it has been assumed for years that the discharge time constants of each mesh, or each network connected in cascade, should preferably be equal, since distortion in the discharge pulse would result if this condition did not exist. Effort has been directed, therefore, to the manufacture of cascade networks possessing meshes of equal time constant. We have found, however, that it is possible to obtain outstanding results, and, in many cases, far superior results (referring to the characteristics of the discharge pulse) by producing and utilizing cascade networks or a plurality of cascade networks whose inductances are connected in series in which the time constants of the individual meshes decrease as the open end of the line is approached. For example, referring to Figure 3, the mesh nearest terminal 46 would have a time constant less than that of the adjoining mesh, while the latter would have a time constant less than that of the next mesh. The mesh nearest terminal 44 is at the so-called open end of the line, so it would have the highest time constant. This novel discovery not only aids in improving the shape of the pulse itself, but also greatly simplifies the manufacture of the network, since less care in equalizing time-constants of individual meshes need be observed.

We have further discovered that very useful networks may be produced in which, referring to Figures 4 and 5, the individual cascades possess different impedance values. Thus, we have found it possible to produce networks which are exactly matched to the load, and at the same time are capable of forming substantially distortionless discharge pulses. The advantage of this will be more fully realized by a consideration of the fact that it is often impossible to construct a useful pulse-forming network which will match a load possessing an impedance differing from that offered by a network designed to give the desired pulse. Our discovery that the impedance values of the two cascades need not be the same permits production of a wide and useful range of networks not heretofore considered feasible.

Referring to Figure 1 as a specific example, with switch 14 connected to terminal A, impedance relations will be considered. If the surge impedance of the load 33 is $Z_L$, the surge impedance of the second cascade is $Z_G$ and the surge impedance of the first cascade is $Z_M$, we have found that the most satisfactory distortionless operation of the discharge circuit may be obtained when $Z_G+Z_M=Z_L$.

This may be achieved in the composite network element of Figure 1 by use of two individual networks. It should be pointed out that $Z_M$ is not necessarily equal to $Z_G$, and is equal only in the case where $Z_G=\frac{1}{2}Z_L$.

For example, if the total capacity and total inductance values of the network sections of Figure 4 were as follows:

| | Capacity | Inductance | $Z=\frac{L}{C}$ |
|---|---|---|---|
| First Section | .02 mfd | 12.5 microhenry | $Z_M$=25 ohms. |
| Second Section | .01 mfd | 25.0 microhenry | $Z_G$=50 ohms. |

The dual unit would be matched to a load possessing a 75 ohm impedance level.

As many widely different embodiments of this invention may be made without departing from the spirit and scope thereof, it is to be understood that the invention is not limited to the specific embodiments described herein except as defined in the appended claims.

What we claim is:

1. An electrical network comprising two cascades of series-inductance, shunt-capacitance meshes with all inductances of both cascades connected in series and the capacitances of each cascade only connected in shunt, input terminals connected to the extreme ends of the inductances and to the junction of the inductances between the two cascades, and a separate output terminal connected to the common shunt capacitance lead of each cascade.

2. An electrical circuit comprising a load, an electronic switching tube and the electrical network of claim 1, with associated charging means, one of the three input terminals of said network being connected to the plate of said switching tube, one side of the load being connected to an output terminal of said network and the other side of the load being connected to the other output terminal of said network and to the cathode of said switching tube.

3. An electrical circuit comprising a load, a thyratron switching tube and the electrical network of claim 1, said network being provided with charging means and with a single pole, triple throw switch connecting a selectable one of the input terminals to the plate of said thyratron tube, one of said output terminals being connected to one side of the load and the other of said output terminals being connected to the other side of said load and to the cathode of said thyratron tube.

4. An electrical network comprising two cascades of series-inductance, shunt-capacitance meshes, with all inductances of both cascades connected in series, input terminals connected to the extreme ends of the inductances and to the junction of inductances between the two cascades, and a separate output terminal connected to the common shunt capacitance lead of each cascade, said cascades possessing different impedance values.

5. An electrical network comprising two cascades of series-inductance, shunt-capacitance meshes, with all inductances being connected in series, each mesh inductance consisting of a coil with a Q between about 1 and about 100 and with a resonant frequency at least twice the first anti-resonant frequency of the network, input terminals connected to the extreme ends of the inductances and to the junction of inductances between said cascades, and individual output terminals being connected to the common shunt capacitance lead of each of said cascades.

6. An electrical network comprising a cascade of series-inductance, shunt-capacitance meshes, each mesh inductance consisting of a coil with a Q value between about 1 and about 100 and with a resonant frequency at least twice the first anti-resonant frequency of said network, each shunt capacitance consisting of a stacked plurality of wound condenser units having terminal tabs extending from the same side of the winding and being connected in series through said terminal tabs.

PRESTON ROBINSON.
WILLIAM M. ALLISON.
NELSON E. BEVERLY.

REFERENCES CITED

The following references are of record in the file of this patent:

UNITED STATES PATENTS

| Number | Name | Date |
|---|---|---|
| 2,390,563 | Tawney | Dec. 11, 1945 |
| 2,394,389 | Lord | Feb. 5, 1946 |
| 2,420,302 | Darlington | May 13, 1947 |
| 2,420,309 | Goodall | May 13, 1947 |
| 2,429,471 | Lord | Oct. 21, 1947 |
| 2,435,331 | Street | Feb. 3, 1948 |